(12) United States Patent
Coupar et al.

(10) Patent No.: US 11,602,773 B2
(45) Date of Patent: Mar. 14, 2023

(54) VISION-ENHANCED PHOTOCELL SYSTEM FOR PACKAGE SORTING

(71) Applicant: United States Postal Service, Washington, DC (US)

(72) Inventors: George Coupar, Leesburg, VA (US); Jeffrey Adin Fox, Alexandria, VA (US); James Whipple, Greenbelt, MD (US); Gabriel Difurio, Stevenson, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 778 days.

(21) Appl. No.: 16/578,689

(22) Filed: Sep. 23, 2019

(65) Prior Publication Data

US 2020/0094288 A1    Mar. 26, 2020

Related U.S. Application Data

(60) Provisional application No. 62/735,539, filed on Sep. 24, 2018.

(51) Int. Cl.
*B65G 43/08*    (2006.01)
*B07C 3/14*    (2006.01)
*B07C 3/12*    (2006.01)
*B65B 57/12*    (2006.01)

(52) U.S. Cl.
CPC ............. *B07C 3/14* (2013.01); *B07C 3/12* (2013.01); *B65B 57/12* (2013.01); *B65G 43/08* (2013.01); *B65G 2201/0285* (2013.01); *B65G 2203/0208* (2013.01); *B65G 2203/041* (2013.01); *B65G 2203/044* (2013.01)

(58) Field of Classification Search
CPC combination set(s) only.
See application file for complete search history.

(56) References Cited

U.S. PATENT DOCUMENTS 5,620,102 A * 4/1997 Finch, Jr. ............... B07C 5/362
                                                    209/583
5,977,501 A * 11/1999 Werkheiser ............ B07C 3/02
                                                    209/555
6,471,039 B1 * 10/2002 Bruun .................... B65G 37/02
                                                    198/577

(Continued)

*Primary Examiner* — Kyle O Logan
(74) *Attorney, Agent, or Firm* — MH2 Technology Law Group, LLP

(57) ABSTRACT

A system and method for enhanced monitoring and sorting of delivery items, such as packages, which are moved and sorted via a delivery service conveyor device. Conventional systems may employ photocells, which detect interrupted light beams, to identify packages or delivery items along a conveyor path. The present system and method enhances photocell function by adding image detection and analysis to the mail path; and further by modifying the photocell signals to the sorter/conveyor control. The present sensing system is located in the same area on the transport as the photocell, and uses a camera to capture an image of the mail path in the photocell area. The system and method then analyzes a package image to formulate a more accurate item detection signal, based on photocell data and image data, for input to the sorter/conveyor control system.

20 Claims, 8 Drawing Sheets

(56) References Cited

U.S. PATENT DOCUMENTS

| | | | |
|---|---|---|---|
| 2002/0118873 A1* | 8/2002 | Tran | G06T 7/44 |
| | | | 382/143 |
| 2004/0222070 A1* | 11/2004 | Neiser | B65G 1/08 |
| | | | 198/786 |
| 2010/0145504 A1* | 6/2010 | Redford | G10L 15/26 |
| | | | 382/101 |
| 2014/0277698 A1* | 9/2014 | Combs | G05B 19/4189 |
| | | | 198/460.1 |
| 2017/0312789 A1* | 11/2017 | Schroader | B65G 43/10 |
| 2017/0349385 A1* | 12/2017 | Moroni | B65B 35/36 |
| 2019/0193945 A1* | 6/2019 | Schroader | B65G 43/08 |
| 2019/0202642 A1* | 7/2019 | Schroader | B65G 43/10 |
| 2022/0018955 A1* | 1/2022 | Christiansen | A01D 43/073 |

\* cited by examiner

Exemplary Item Processing/Sorting Conveyor System with Photoelectric Sensor and Overhead Camera Exemplary Method for Enhanced Item Detection Signal Using Photocell and Camera

VISION-ENHANCED PHOTOCELL SYSTEM FOR PACKAGE SORTING

CROSS REFERENCE TO RELATED APPLICATIONS

This application claims the priority and benefit of U.S. Provisional Application No. 62/735,539, filed on 24 Sep. 2018, which is hereby incorporated by reference in its entirety.

FIELD OF THE INVENTION

This disclosure is generally directed to systems and methods for efficient mechanical movement, processing, and sorting, within a delivery service processing center, of physically tangible delivery items such as U.S. postal mailings, including packaged items. More specifically, the disclosure relates to systems and methods to provide for effective electronic sensing of tangible delivery items and packages while the packages are being moved and sorted via conveyor belts and via similar, localized, mechanical conveyance and sorting systems and devices

BACKGROUND

Note that, herein, the term "mail" may sometimes be employed interchangeably with "delivery item" or "delivery package"; as used herein, "mail" may also refer in an exemplary sense to U.S. Postal Mail, and may also refer generically to delivery items delivered by any delivery service, government or private, including for example and without limitation the United States Postal Service (USPS), the United Parcel Service (UPS), and Federal Express (FedEx). The terms "tangible mail," "item of tangible mail," "delivery item," "tangible item," "delivery package", "package," and simply "item" are used interchangeably herein, referring generically to deliverable printed matter, packages, and packaged materials transported by delivery services (government or private).

The past two decades have seen a dramatic increase in the use of electronic communications—such as e-mail, web pages, and file-sharing—to replace or supplement physical, hard-copy item delivery. However, it also continues to be the case that printed letters, printed brochures and publications, parcels, packaged goods, and in general various tangible, physical items are physically transported from a sender to a recipient by services such as the U.S. Postal Service (USPS), Federal Express (FedEx) corporation, United Parcel Service (UPS) corporation, and the like.

Delivery of tangible items generally entails placing an item in some manner of box, wrapping, or container, and placing on the exterior of the container one or more labels or delivery indicia. The indicia typically indicate a sender and a recipient, and often indicates transport costs such as postage. A tangible item, suitably wrapped and labeled, or otherwise prepared for transport by a delivery service, is referred to herein as a "delivery item" or "package."

Delivery items may include parcels or packages, or may include letters contained in envelopes; when transported by the USPS, such letters are conventionally referred to as "mail " It will be understood herein, however, that "mail" is used as a generic term referring to letters and such which are transported by non-governmental delivery services, such as UPS and FedEx, and others.

Delivery items may also include packages and parcels. For purposes of this document, the term "delivery items" may also refer to bound bundles or to trays which are used to deliberately assemble and transport multiple individual documents, small boxes, etc., as a group, at least as an interim aspect of transport.

Item processing and sorting: With most delivery services, such as USPS, UPS, and FedEx, the process of delivering multiple delivery items to various recipients involves sorting the delivery items to ensure the items are carried (by trucks, airplanes, persons, etc.) along appropriate delivery routes. Handing of the delivery items occurs at delivery service processing/sorting facilities, which are typically physical buildings with suitable interior equipment and infrastructure to process delivery items. Among other elements, the processing/sorting facilities may employ extended conveyor systems to internally route and distribute delivery items along various transport paths. In some cases, within a processing/sorting facility, some delivery items, such as letters or mail, may be transported along, at least in part, in groups or bundles, for example held in trays which travel on the conveyor systems.

Sorting and Material Handling (SMH) systems: These conveyor systems, including suitable sensors to read delivery item indicia and tray labels, and mechanical elements to distribute and route delivery items, may be referred to as Sorting and Material Handling (SMH) systems.

Photocells: SMH systems function, in part, by identifying discrete packages, trays, or in general delivery items positioned on the conveyor systems. In current SMH systems, photocells (also known as light detectors and light barriers) are used extensively to detect parcel or tray mail movements on a sorter or conveyor.

The photocells are relatively simple devices. A light source, such as an LED, transmits an infrared light beam to a photocell receiver positioned across the path of the item to be detected. When no delivery item is present, the photocell detects the light from the LED.

If a parcel or tray moves between the LED and the photocell, the light is (most of the time) blocked, and the receiving photocells detects the temporary loss of infrared light. The photocell then activates a signal to the sorter or conveyor control system; the control system is then aware that the mail item is positioned in the path of the photocell beam.

Some photocells have the transmitter and receiver in the same package using a reflector at the far side of the detection path, but the functionality is effectively the same. Photocells often include multiple arrays to improve detection and the light area but, again, functionality is substantially the same. Interruption of a light beam or beams should flag or signal that a delivery item is moving on the conveyor across the path of the light beam.

Correct detection of mail item positioning in a sorter or conveyor system is important to allow the items to be moved correctly and at the precise time to intersect or interact with mechanical moving devices. Item detection is also required to ensure singulation of items (that is, identification of one delivery item as being separate and distinct from the other delivery items), and to identify correct spacing so that sorting and movement of delivery items is correct. Consequently, the control system on SMH conveyor systems is relatively sophisticated and "intelligent" to control and time conveyors for moving items.

Photocell limitations: Photocell devices however are very crude. A single signal is designed to indicate the presence of a deliverable item in the photocell beam.

However, as deliverable items move into the photocell beam they may bounce slightly, or even roll over as they are conveyed, causing a momentary "break" of the infrared light to the receiver, followed by a momentary clear and then a "break" again as the item solidly positions in the photocell beam. As the item is conveyed further through the photocell area, leaving the beam, the same sequence may reoccur.

The resulting erratic signaling (e.g. false positives and/or false negatives) to the sorter/conveyor control system confuses the system, making it hard for the "intelligent" control to correctly locate the item's position, length and singulation. Due to these signal inconsistencies, control system algorithms which are broadly accurate or valid (in the sense of identifying and sorting mail items correctly most of the time) may occasionally erroneously determine that two pieces are together on the conveyor, or that an item is mispositioned, and so erroneously stop the transport for unneeded manual correction or take other unneeded or incorrect actions.

Similarly, oddly shaped items, glossy items, items with loose attachments or small flat pieces that do not fully "break" the photocell light beam also cause misdetection by photocells and consequently misinterpretation by the control system. The resulting manual correction of unneeded machine stoppages causes loss of productivity and mail delays.

On large bulk conveyor systems the same issues occur but with larger amounts of mail. Delivery items may become "sticky" when wet, or prone to static in dry situations such when two delivery items are incorrectly detected by photocells as being a single item. Photocells cannot distinguish the separate, stuck-together delivery items in these situations, and sorting machine productivity is negatively impacted when delivery items are not moved correctly.

Similarly, large volumes of mail sometimes contain magnets (such as refrigerator surface magnets used by some companies for advertising), and a problem frequently occurs where such mail pieces magnetically "stick" in front of light barriers indicating the presence of multiple pieces of mail, or indicating a stuck package, when only a single piece exists or when other pieces continue to move along properly (outside the path of the stuck piece). This again provides incorrect information to the control system and causes stoppages or miscontrolling of mail on the conveyor.

Multiple photocells exist on most SMH equipment. They are universal, yet the simplicity of photocells causes errors, stoppages and reduced functionality in SMH systems.

What is desirable, then, is a system and method to supplement, complement, or enhance the ability of photocells to correctly identify and locate individual deliverable items along the transport path of an SMH system.

SUMMARY

Accordingly, in one aspect, the present system and method embraces a sensing system with sensing hardware and processing hardware for improved identification of delivery items along the transport path of a conveyor system. Items moving along the conveyor system may be identified, in part, as they interrupt the light path of a light emitter and light detector, where a light beam from the light emitter crosses perpendicular to the direction of motion of the conveyor system.

Various implementations of the present system and method, which may be referred to as a Vision-Enhanced Photocell System (VEPS), enhance the light detector function by adding camera image detection and analysis to the delivery item transport path; and further by emulating or modifying the photocell signals to a sorter/conveyor control.

The VEPS uses a camera to capture an image of the mail path in the photocell area. Using its built-in computing capabilities, the VEPS then uniquely analyzes the delivery item image to formulate a more intelligent and accurate item detection signal to the sorter/conveyor control system. The VEPS is located in the same area on the transport as the photocell.

Electrically, the VEPS is wired between the photocell and the input of the SMH control system. The VEPS receives the photocell signal, but combines this signal with its own image analysis to provide a more accurate signal output to the control system. In doing so the VEPS may avoid mail detection signal interruptions due to bouncing or rolling items, and the VEPS may filter out incorrect photocell signaling based on the image picture of what is really happening with the delivery item and its movement. VEPS can more accurately indicate to the control system the item status and size by true vision analysis.

In an exemplary embodiment, the present system and method embraces one or more computer programs and/or one or more software modules or hardware, which may be run on one or more digital electronic processing devices associated with a sensing system. The sensing system has hardware and processing hardware for improved identification of delivery items along the transport path of a conveyor system.

The software, which may be referred to as a Vision-Enhanced Photocell System (VEPS), identifies items moving along the conveyor system in part by flagging interruptions in the path of the light beam of a light emitter and light detector, where a light beam from the light emitter crosses perpendicular to the direction of motion of the conveyor system.

The present system and method, which may be referred to as a Vision-Enhanced Photocell System (VEPS), enhances the light detector function by adding camera image detection and analysis to the delivery item transport path; and further by emulating or modifying the photocell signals to a sorter/conveyor control.

The VEPS software uses data from a camera, where the camera captures an image of the mail path in the photocell area. The camera is located in the same area on the transport as the photocell. The VEPS software then uniquely analyzes the delivery item image to formulate a more intelligent and more accurate item detection signal to the sorter/conveyor control system.

The VEPS software serves to intervene between the photocell and the input of the SMH control system. The VEPS software receives the photocell signal, but combines this signal with its own unique image analysis to generate or provide a more accurate signal output to the control system. In doing so the VEPS software may avoid mail detection signal interruptions due to bouncing or rolling items, and the VEPS filters out incorrect signaling based on the image picture of what is really happening with the delivery item and its movement. The VEPS software can more accurately indicate to the control system the item status and size by true vision analysis.

In another aspect, the present invention embraces methods which may be implemented in a sensing and processing device by hardware controlled by suitable software or firmware, the methods being substantially in accordance with the descriptions provided above for hardware and software embodiments of the present system and method.

The foregoing illustrative summary, as well as other exemplary objectives and/or advantages of the invention, and the manner in which the same are accomplished, as well as additional or alternative features or embodiments, are further explained within the following detailed description and its accompanying drawings.

DETAILED DESCRIPTION

Figure 1:
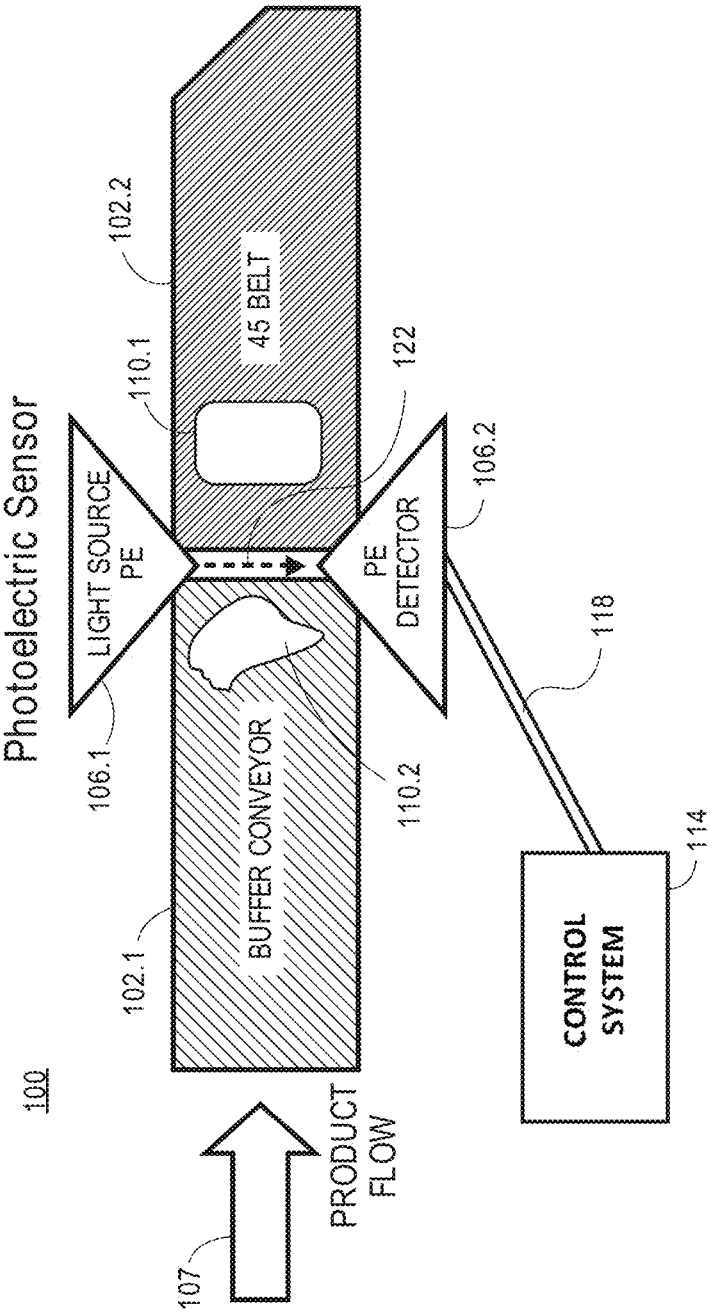
FIG. 1 schematically depicts some elements of an exemplary SMH/conveyor system which may be used to convey deliverable items or packages.

In the following description, certain specific details are set forth in order to provide a thorough understanding of various embodiments. However, one skilled in the art will understand that the invention may be practiced without these details. In other instances, well-known structures associated with computers or with robotic systems, conveyor systems, cameras, photodetection, wired or wireless communications, with other digital devices, with data display, and/or with data storage or data transmission, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret or limit the scope or meaning of the claimed invention.

Reference Numbers: Reference numbers are used throughout the figures, and the first digit of a reference number generally indicates the first drawing where the associated element appears. For example, an element 207 first appears in FIG. 2.

In some instances, an element may be shown in both a generic form and a more specific form or species; in these cases, the specific form or species may be indicated by an appended period (".") followed by a digit or digits to distinguish a species of the general form.

Terms

Sensing System and Vision-Enhanced Photocell System: Herein, the present system and method may be characterized at points in terms of a representative or exemplary system being developed by the United States Postal Service (USPS), and referred to as the USPS mail Vision-Enhanced Photocell System (VEPS).

It will be understood, however, that this system, as well as the term Vision-Enhanced Photocell System and the acronym "VEPS" refer to an exemplary embodiment only. The present system and method encompasses other sensing systems as yet undeveloped or to be developed, which employ substantially the same elements and/or method steps, which may be designed or developed by parties other than the USPS, and which may be referred to by terms other than Vision-Enhanced Photocell System or VEPS.

Delivery Item: As used in this document, a delivery item or tangible delivery item generally refers to a portable, usually hand-deliverable physical item with a container or wrapper around it, the container or wrapper having imprinted on it (or otherwise conveying) necessary information for conveyance of the physical item from a sender to a recipient. In some instances the exterior wrapping may be omitted, as for example with a postcard or a brochure with suitable tape to close the brochure, where the card or sealed brochure itself is the physical item and has suitable labeling directly imprinted or attached.

The physical item may include for example and without limitation paper or papers, printed matter, or various tangible products or items to be physically transported from an item sender to an item recipient via an item delivery service, often entailing hand transport and delivery along at least part of the route. For example without limitation, any of a parcel, a package, a letter, a document, a cell phone, a child's toy, or a diamond ring, suitably contained or wrapped and labeled for transport, would all be examples of delivery items.

The term delivery item, also typically encompasses printed matter or other indicia (for example, postal stamps of the U.S. Post Office or other national postal services, or bar codes employed by both postal services and private delivery companies) which may indicate, among other elements, payment of tangible item transport costs.

Delivery Service: A delivery service is any organization, governmental or private, which transports tangible items from a specific sender to a specified recipient. Such delivery services include for example and without limitation the U.S. Postal Service, other national postal services, UPS, and FedEx, as already enumerated above. Any references herein to the United States Postal Service will therefore be understood as exemplary only, and not limiting.

Delivery Service Package Processing Center (DSPPC): A facility maintained by a delivery service which receives delivery items or packages, determines their destinations, and sorts the delivery items for routing to appropriate routing systems or vehicles. Such facilities typically house sorting and material handling (SMH) systems including conveyor systems and electro-mechanical sorting mechanisms, as described herein further below.

Conveyor System/Conveyor Device: These are equivalent terms in this document. A system of transport mechanisms, which are typically horizontal or semi-horizontal belts but may include other mechanisms as well, and which is configured to support delivery items and transport the delivery items from a first location within a facility to a second location within a facility under computerized control.

Conventional System

With reference to the discussion below, elements of am exemplary SMH system 100, or delivery item or package processing/sorting system 100, are illustrated.

FIG. 1 illustrates some elements of an exemplary conveyor system 100, as already known in the art, which may be used to convey deliverable items or packages 110. Persons skilled in the relevant arts will recognize that the exemplary conveyor system 100 is illustrated with only those elements which are helpful to conveying context or understanding for the present system and method, and that many other typical or necessary elements of such a system are omitted for clarity of exposition.

Conveyor system 100 may include one or more conveyor devices or conveyor belts 102, such as buffer belt 102.1 and "45" belt 102.2, which may for example be inclined at an angle or directed to a new angle (not illustrated) with respect to buffer belt 102.1.

The conveyor belts 102 are typically driven via one or motor motorized gear mechanisms (not illustrated in the figure) to move the tangible items 110 in a selected product flow direction 107. The motorized elements, and therefore the belts 102, are in turn controlled by one or more digital and/or analog processing, monitoring and control systems, referred to herein as the control system(s) 114. The control system 114 (e.g., an induct control board, a control board, a control ASIC, a processor functioning with other chips (such as memory) as a control system) may control the start and stop motion of the conveyor belts 102, and may also control their speed. In an embodiment, the processing, monitoring, and control system 114 may be construed as including all of the control electronics (digital and/or analog); and also including the sensing devices such as the photocells 106, and/or also including some or all circuits for mechanical control. See FIG. 9, below, for a discussion of an exemplary digital processing, monitoring, and control system 114 (relabeled in that figure as "900").

Transition Locations and Sorting Mechanisms: At various points along the path of the conveyor system 102, which may be referred to as transition locations or receiving points, the conveyor system 102 may also include various electro-mechanical sorting mechanisms, shunting mechanisms, robotic arms, and other servo-mechanisms (not illustrated in FIG. 1) for sorting/shunting one or more packages 110 onto various alternative paths or side conveyor devices (not illustrated). The receiving points may also be locations for sorting/shunting one or more packages 110 into destination cargo boxes or containers (also not illustrated). The control system 114 may also control these shunting mechanisms. Receiving points may also be referred to synonymously as transition locations, receiving locations, and also as sending points or locations, transit points, shunting points, sorting points, or by other similar terms.

For the packages 110 to be properly directed along alternative paths, or to transition smoothly from one conveyor belt 102 to another at receiving points, it is generally helpful or necessary that the control system 114 be able to distinguish one package 110 from another. Two exemplary packages are shown in the figure, a first regularly shaped (typically cuboidal) package 110.1, and a second irregularly shaped package 110.2.

Photoelectric System, Light Source, and Photodetector: In a known technology, a photoelectric system 106 may be employed to distinguish separate packages 110. The photoelectric system 106 may be communicatively coupled to the control system 114 via a wired or wireless communications link 118.

By way of background, the term "photo" in "photoelectric" refers to light, and in particular to particles of light.

The photoelectric system 106 may consist of two or more distinct elements, but may typically include both a light source 106.1 or light emission element 106.1 (such as an LED or laser) and a photodetector 106.2 (also referred to synonymously in this document as a "light detector 106.2" or "photo eye 106.2"). In an embodiment, the light emission element 106.1 and light detector 106.2 may be oppositely positioned with respect to each other, and further positioned at the sides of the conveyor system, with the joining line between them (and therefore the direction of light travel) being perpendicular to the direction 107 of product flow of the conveyor belts 102.

The location along the conveyor system 102 where the photoelectric system is located may be referred to as the "sensing location." In this way, the photoelectric system 106 is configured to send a beam of light 122 (also referred to as "light beam 122") over the path of the conveyor belts 102, at the sensing location, thereby crossing the transit route of the packages 110. Via the connection 118, the photoelectric system 106 is configured to send a light status signal 202 (see FIG. 2, below) to the control system 114, indicating when the photo detector 106.2 detects the light beam 122, and also when the photodetector 106.2 does not detect the light beam 122.

In an alternative embodiment, the photoelectric system 106 is configured so that the light emission element 106.1 and the photodetector 106.2 are substantially adjacent to each other on one side of the conveyor belt 102, with a mirror (not illustrated) opposite to them (on the other side of the conveyor belt 102) to reflect the light 122 from the light source 106.1 back to the light detector 106.2.

As will be apparent to persons skilled in the art, the intent of this exemplary configuration is that when a package 110 crosses the path of the light beam 122, light beam 122 is blocked by the package 110 and the detection of the light beam 122 is interrupted. The photoelectric sensor 106 sends a signal 202 (see FIG. 2, below) to control system 114, indicating the detection or lack of detection of the light beam; in turn, on- logic of the control system 114 uses such light signal information to assess the respective absence or lack of a package 110 or presence of a package 110 in the path of the light beam 122.

As noted in the background discussion above, a variety of factors may intervene to prevent a clear, reliable, accurate correlation between the presence or absence of a light beam 122, and the respective absence or presence of a package 110. For example, irregularly shaped packages 110.2 may only intermittently interrupt the path of the light beam 122. Packages may also roll over. Or two packages 110 may be so close together that they continuously interrupt the path of light beam 122, leading control system 114 to infer the presence of only one package 110 when in fact two packages 110 are present.

Figure 2:
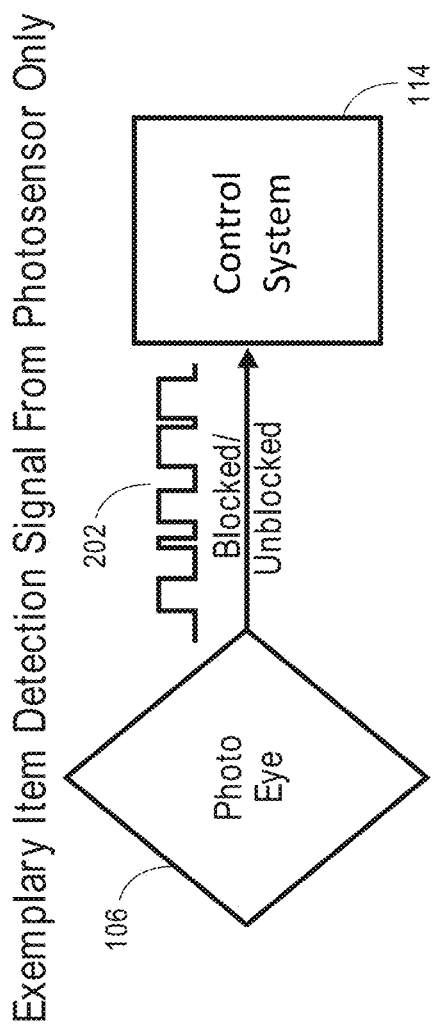
FIG. 2 depicts an exemplary control signal which may be sent from a photoelectric sensor to a control system based on light detection only.

FIG. 2 illustrates an exemplary control signal 202, also referred to as "light status signal 202", which may be sent from the photoelectric sensor 106 to control system 114. The light status signal 202 or control signal 202 may have multiple states or multiple statuses. In the exemplary light status signal 202 shown, a high state or high status may indicate a blocked light beam, which may be indicative of the presence of a package or other deliverable item in the path of light beam 122. Similarly, in the exemplary signal 202 illustrated, a low state or low status may indicate an unblocked light beam (that is, a beam of light which successfully crosses over the belt 102 from one side to the other), which may be indicative of the lack of a package or other deliverable item in the path of light beam 122. In an alternative embodiment, the high and low states may have the opposite significations. In an alternative embodiment, other forms of signaling (such as digital signals or other forms of analog signals) may be employed.

However—for exemplary causes stated immediately above, and for other causes as well—when only a photoelectric system 106 is employed, the correlation between high and low signal states on the one hand, and actual presence of lack of an item, may not be reliable or completely accurate. That is, the photoelectric system 106 may erroneously signal a high/blocked state/status when a package is not present, or may erroneously signal a low/unblocked state/status when in fact a package is present.

Exemplary Systems for Vision Photocell Processing

Figure 3:
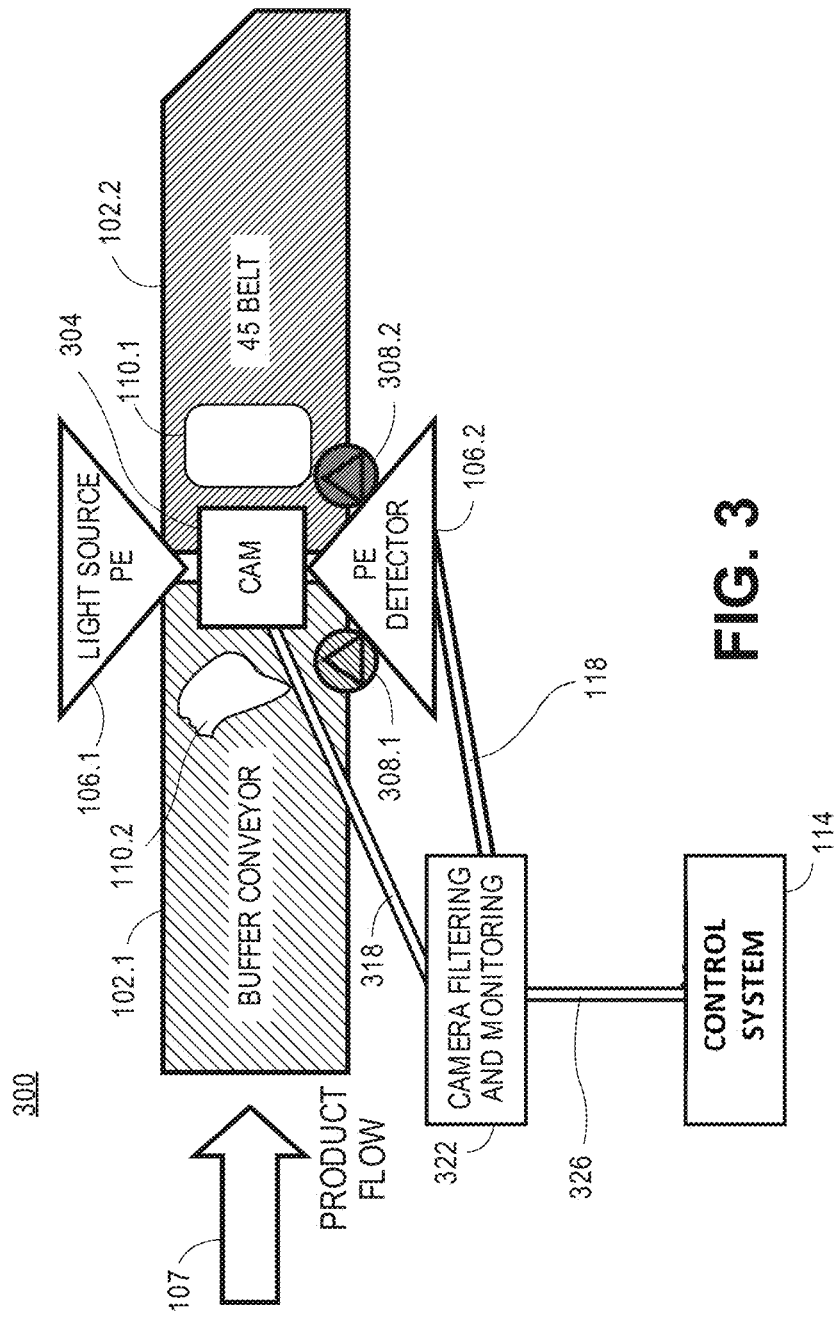
FIG. 3 illustrates an overhead view of an exemplary system for delivery item processing/sorting with a photoelectric cell and camera, according to the present system and method, also referred to herein as a vision-enhanced photocell system.
Figure 4:
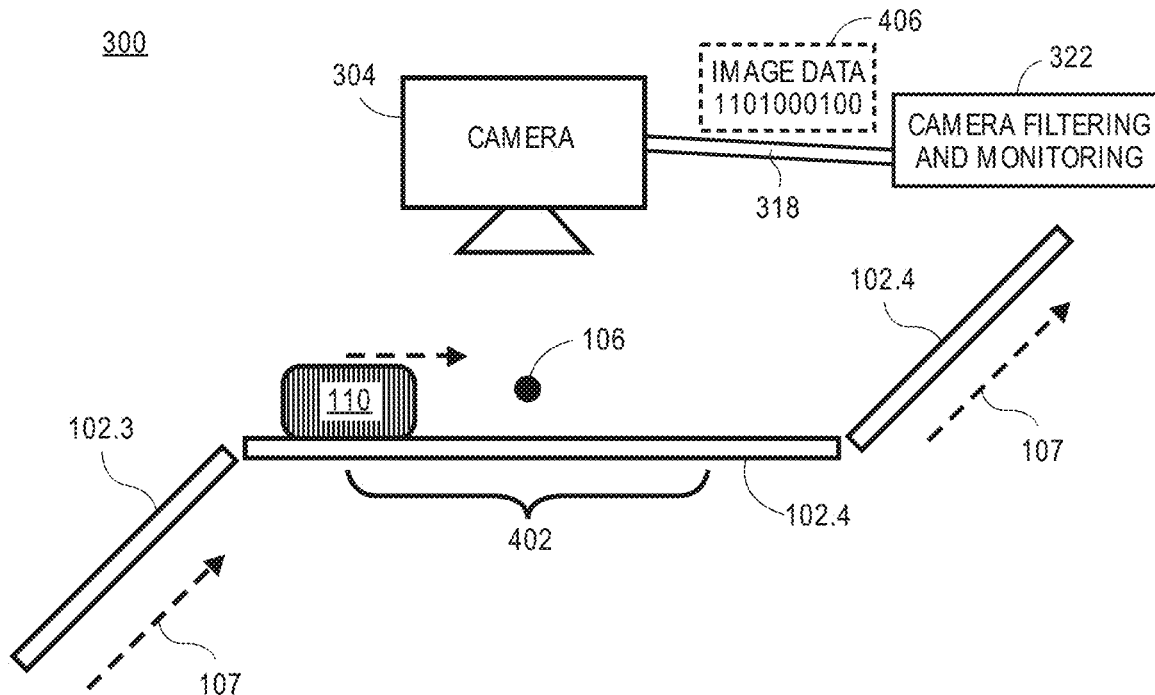
FIG. 4 illustrates a side view of an exemplary vision-enhanced photocell system, according to the present system and method.

FIGS. 3 and 4 illustrate an exemplary system 300 for delivery item processing/sorting with a photoelectric cell 106 and camera 304, according to the present system and method. The exemplary system 300 may also be referred to herein as a vision-enhanced photocell system 300.

As used herein, the term "vision-enhanced photocell system 300" (VEPS) may encompass all or any of: a sensing system which may accompany and support a conveyor belt system and sorting system (i.e., an SMH); a sub-portion of a sensing system (for example, a camera 304 and processor 905) which may accompany and support an SMH system; and/or the whole or partial sensing system plus the conveyor belt and sorting systems.

Many elements of the vision-enhanced photocell system 300 are substantially the same or similar to the elements of the item sorting/processing conveyor system 100 discussed above in conjunctions with FIG. 1, and discussion of those elements is not repeated here. New or modified elements are discussed immediately below, along with their interactions with existing elements.

In an embodiment, the vision-enhanced photocell system 300 includes a camera 304 to aid in distinguishing the presence and absence of packages 110. In an embodiment, the camera 304 is positioned near conveyor belts 102 and also substantially proximate to photoelectric system 106. In this way, the camera 304 obtains a view of the packages 110 as they move along the conveyor belts 102, at substantially the same time that the packages 110 are in proximity to the photoelectric cell 106.

In an embodiment, the camera 304 is fixed in place or positioned overhead, above conveyor belts 102, with a downward looking view of the conveyor belts 102 and any packages 110 which may be on the belts 102. (See also the side view of FIG. 4.) In an embodiment, the camera 304 is positioned substantially above and along the midline or centerline of conveyor belts 102. In an embodiment of the present system and method, the camera 304 is placed substantially along the midpoint of the path of light beam 122 (shown in FIG. 1, not illustrated in FIG. 3 or 4), and therefore along the centerline of a line joining two opposing elements of photoelectric system 106.

In an alternative embodiment, other positions for camera 304 may be envisioned. In an alternative embodiment, two or more cameras 304 may be employed. For example, a single camera 304 may provide only a two-dimensional view of the conveyor belt 102 and the packages 110, while using multiple cameras may provide for or enable (with suitable digital processing) a three-dimension view of the conveyor belt 102 and the packages 110. In an embodiment, multiple cameras may also facilitate or enhance an ability to distinguish between a single package 110 versus two or more packages 110 which are closely spaced, stuck to, or touching each other.

Since camera 304 is used principally for identification of the presence of packages, in an embodiment a black-and-white or monochrome camera 304 may be employed. In an alternative embodiment, a color camera 304 may be employed. In an embodiment, a camera 304 configured to take successive still images may be employed. In an alternative embodiment, a video camera 304 may be employed.

The camera 304 may be communicatively coupled to a camera filtering and monitoring module 322 via a wired or wireless link 318. In an embodiment of the present system and method, the camera filtering and monitoring system 322 may comprise a set of electronic processing elements separate and apart from control system 114, possibly even in a separate housing from control system 114. In such an embodiment, the camera filtering and monitoring system 322 may consist of some elements, such as a microprocessor 905 and memory 910, 915, 920, and other elements of the exemplary digital processing, monitoring, and control system 900 (see FIG. 9 below for details). In such an embodiment, the camera filtering and monitoring system 322 may be an on-board element of camera 304, or may be apart from camera 304. In such an embodiment, the camera filtering and monitoring system 322 may be communicatively coupled with control system 114 via a wired or wireless link 326.

In an alternative embodiment (not illustrated in the figures), the camera filtering and monitoring system 322 may be an element of the control system 114. For example, the camera filtering and monitoring system 322 may be a dedicated microchip processor which is part of the control system 114, or may be a firmware or software module running on a microprocessor 905 of the control system 114.

Camera 304 transmits image information or image data 406 (see FIG. 4), or simply "an image 406", to the camera filtering and monitoring system 322 via the link 318. The image 406 may be transmitted via the link 318 in a variety of digital formats known in the art or yet to be developed, including for example and without limitation bitmap formats, JPG, PNG, and TIFF. In an embodiment, the camera 304 may be configured to perform some digital preprocessing of images, for example to transform a captured bitmap image to vector format, and then send the image data 406 to the camera filtering and monitoring system 322 via the link 318 in a variety of vector formats known in the art or yet to be developed.

In an embodiment of the present system and method, the camera 304 may be configured to take pictures of the conveyor belt(s) 102, for example at regular time intervals, including for example and without limitation at a rate of one image every several milliseconds, or several tens or images per second or a dozen or dozens of images per second, or one image per second or two images per second; other rates may be envisioned as well. In an alternative embodiment, the rate of picture taking may be varied or adjusted in accordance with the speed of the product flow 107.

In an alternative embodiment, the camera 304 may be configured to take a picture of the conveyor belt 102 every time there is a change in the light status signal 202 or control signal 202 indicating the light beam 122 has gone from blocked to unblocked (for example, high to low), or unblocked to blocked (for example, low to high).

In an embodiment of the present system and method, the camera 304, and the activity of image-taking by the camera 304, may be controlled by the direct signal linkage between the photoelectric system 106 and the camera 304.

Figure 6:
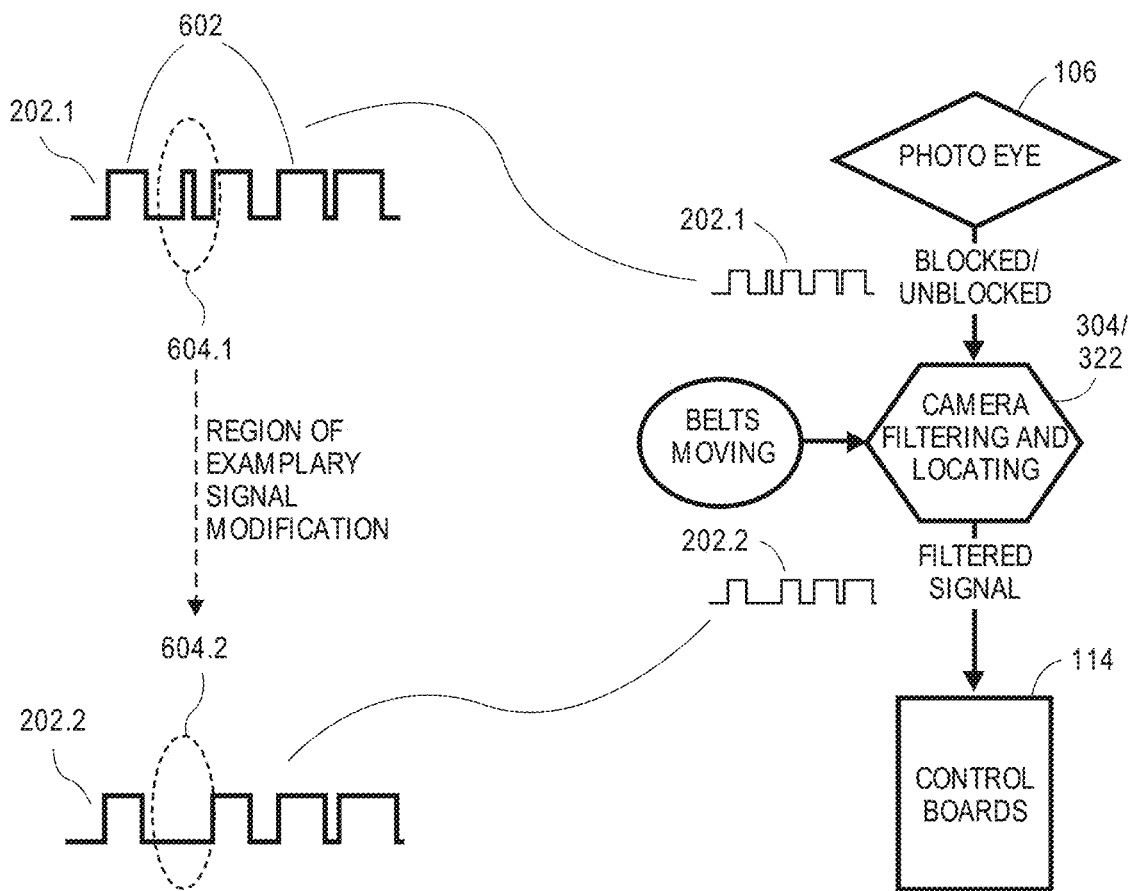
FIG. 6 diagrammatically represents a modification process of an exemplary package detection signal according to the present system and method.

In an embodiment of the present system and method, camera filtering and monitoring system 322 employs a processor 905 (see FIG. 9) to modify the raw light status signal 202.1 based on the images 406 from camera 304 (see FIG. 6). The camera filtering and monitoring system 322 then sends an enhanced light status signal 202.2 to control system 114.

Status Indicator Lights: In an alternative embodiment illustrated in FIG. 3, the light indicators 308, such as the LEDs 308.1, 308.2, may be positioned in proximity to the camera 304. The status indicator lights 308 may be configured to signal or indicate visually when the photoelectric cell 106 determines that the light path 122 is blocked or unblocked. For example, a first LED 308.1 may illuminate to visually indicate a blocked path, and a second LED 308.2 may illuminate to visually indicate an unblocked path. In an alternative embodiment only one light indicator 308 may be used, for example in an on/off state or two-color state (red or green, etc.), or various patterns of blinking on and off, etc. In such embodiments, the camera 304 may be positioned to capture the image of the light indicators 308; and the camera 304 or the processor 905 may process and use the changing of visual indication from the light indicator(s) 308 to determine or trigger, in part or in whole, when to take a photo image of the conveyor 102.

Persons skilled in the relevant arts will appreciate that the status indicator lights 308 are not a part of the photoelectric system 106, and that the status indicator lights 308 are in fact elements separate and apart from the light source 106.1 (which is part of the photoelectric system 106).

FIG. 4 provides a side view of an exemplary system 300 for delivery item processing/sorting with a photoelectric cell 106 and a camera 304, again referred to herein as a vision-enhanced photocell system 300, and which may be the same or substantially similar to the vision-enhanced photocell system 300 illustrated in FIG. 3 above. Some elements from FIG. 3, such as the control system 114 and/or the light indicators 308 may be employed here as well, but have been omitted for clarity of illustration.

The vision-enhanced photocell system 300 includes conveyor belts 102 moving in a direction of product flow 107. The system 300 also includes a photoelectric system 106. Photoelectric system 106 is positioned at a designated height above belts 102 where the light beam 122 (not shown in FIG. 4) employed by the photo electric system 106 may be temporarily blocked or interrupted by a moving delivery item 110 or package 110.

Also illustrated in FIG. 3 is a positioning of the camera 304 above the conveyor belt 102.4, with a field of view 402 centered over the position of photoelectric system 106 (i.e., over the sensing location), to capture a substantially symmetrical image area on either side of the photoelectric system 106. In alternative embodiments, the field of view 402 of the camera 304 may be adjusted so as to have the field of view 402 begin or to end substantially above the photoelectric system 106, or begin or end elsewhere in relation to the photoelectric system 106.

In an embodiment, the field of view 402 of the camera 304 is configured or adjusted to substantially span the width of the conveyor belt 102. In an alternative or complementary embodiment, the field of view 402 of the camera 304 is configured or adjusted to substantially span the size or area of any package or delivery item 110 which it is anticipated may be carried by the conveyor belt 102.

Exemplary Method for Vision Photocell Processing

Figure 5:
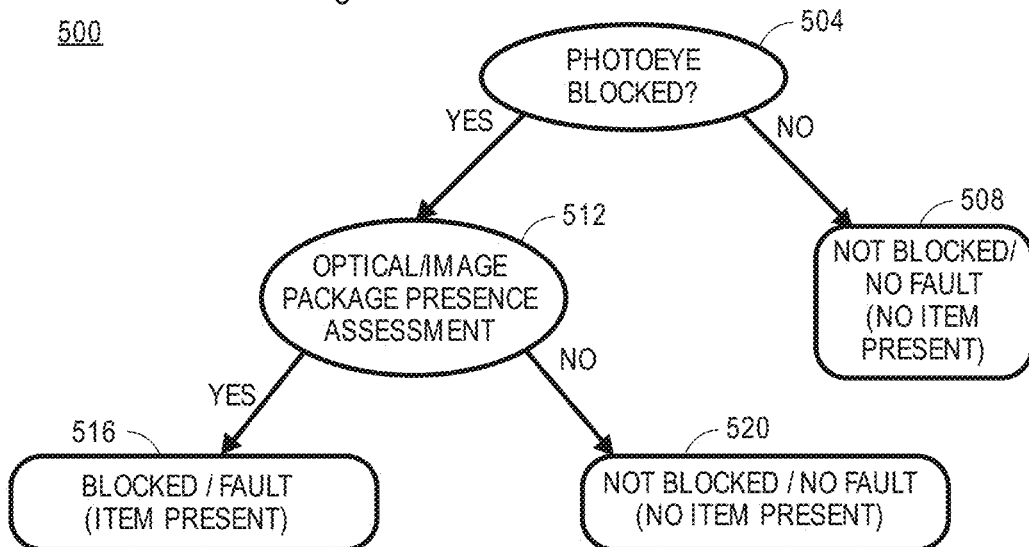
FIG. 5 presents an exemplary method for analyzing both the data from a photodetector and the image data from a camera to correctly distinguish packages on conveyor belt(s) according to the present system and method.

Referring now to FIG. 5, as well as other figures throughout this document, the present system and method embraces methods for analyzing both the control signal 202 from the photodetector 106 and the image data 406 from the camera 304, thereby resulting in enhanced ability to correctly distinguish packages 110 on the conveyor belt(s) 102. FIG. 5 presents an exemplary method 500 for vision photocell processing.

Figure 9:
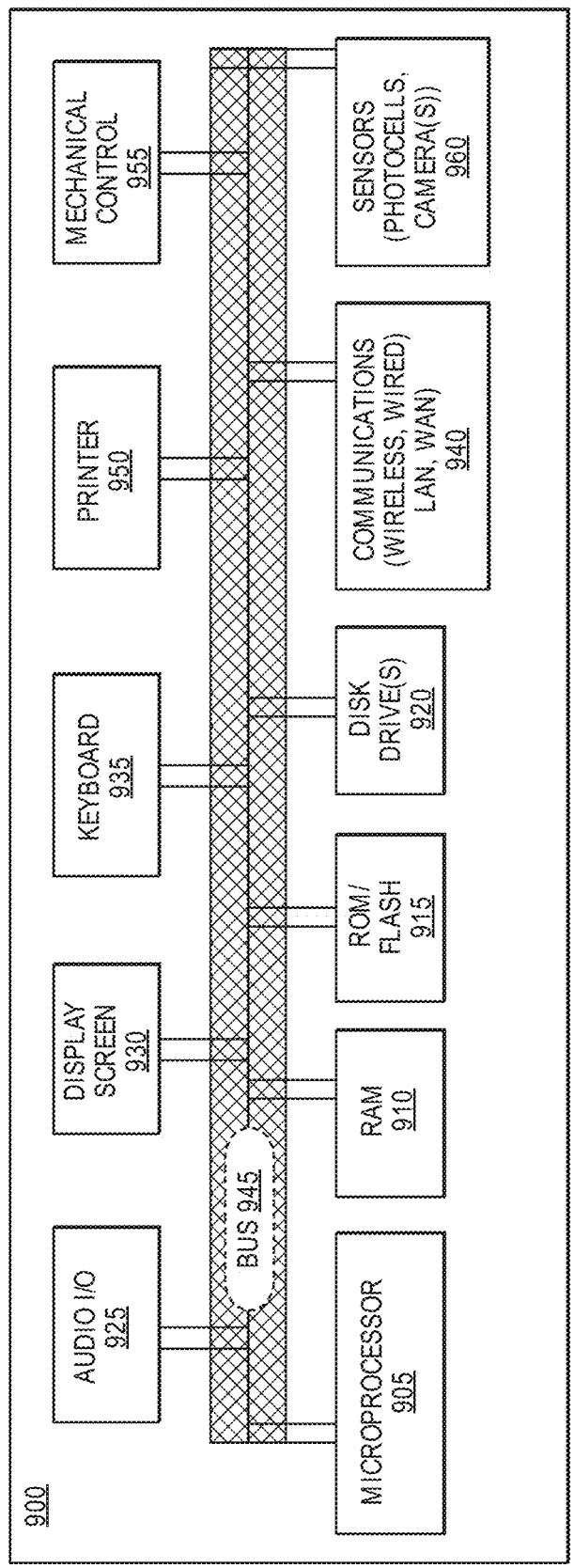
FIG. 9 presents a system diagram of an information processing system, or digital processing, monitoring, and control system, which may be employed as an element of the present system and method.

Exemplary method 500 may be implemented in a variety of ways, using a variety of control electronics and signal processing devices. In an embodiment, the method 500 is envisioned as working within the context of the exemplary vision-enhanced photocell system 300 already described above in conjunction with FIGS. 3 and 4. In particular, both logical determinations and signal processing calculations (including image processing calculations) may be performed by the camera filtering and monitoring system 322 and/or by the control system 114. As discussed in more detail below (see FIG. 9), the control system 114, as well as the camera filtering and monitoring system 322, may include one or more hardware microprocessors 905 configured at least to:

receive light status signals 202, i.e., control signals 202 from the photoelectric system 106 and receive image data 406 from the camera 304 (referred to collectively in FIG. 9 as the sensors 960);

perform logical and signal processing calculations using the microprocessor(s) 905 based on the received signals 202 and on the received image data 406; and responsive to the outcome of the calculations, to then issue electronic control commands to mechanical control elements 955, which in turn control the conveyor belts 102 and other robotic and servo-control mechanisms of the item processing/sorting system 300.

In an embodiment (as illustrated in FIG. 3 above), the control system 114 does not receive the photoelectric signal 202; instead the camera 304 receives the control signals 202 from the photoelectric system 106, and then pre-processes and fine-tunes the control signal based on the image data 406; the camera then sends the processed, refined control signal to the control 114.

In an embodiment, the control system 114 and the camera filtering and monitoring system 322 may include specialized processors 905, including for example and without limitation a dedicated signal processing microprocessor 905 and/ or an image processor 905 to support some steps or operations of the exemplary method 500. The microprocessor(s) 905 may be configured to perform the steps of the exemplary method 500 via software or firmware suitably coded to implement the steps of the method 500.

Exemplary method 500 for enhanced item detection using a photocell and a camera, also known as method 500 for vision photocell processing, begins with operation or step 504. In step 504, suitable microprocessor(s) 905 of the camera filtering and monitoring system 322 and/or the control system 114 and/or (hereinafter, simply "the processors 905") receive light status signal 202 from the photodetector 106. Based on the control signal 202, the processor(s) 905 determine whether the light signal 122 is blocked (possibly indicating the presence of a package 110) or unblocked.

If the determination in step 504 is that the light signal 122 is not blocked from reaching the photoeye 106.2, then the method 500 proceeds to step 508. In step 508 the processor(s) 905 (for example, a processor of control system 114) determines a "Not Blocked" status, which may also be referred to as a "No Fault" condition, and indicates that the light path 122 is not blocked and no delivery item 110 or package 110 is present. This "Not Blocked" or "No Fault" status may be passed to or further processed by control system 114 to determine a suitable transfer action. For example, in an embodiment, a suitable transfer action may entail maintaining the conveyor belt 102 at a current, constant motion, and/or may entail not activating any package shunting mechanisms or routing mechanisms. Other system actions may be envisioned as well. The method 500 then repeats, returning to step 504.

If the determination in step 504 is that the light signal 122 is blocked from reaching the photoeye 106.2 (which may be understood as the assertion of a "Blocked" status or "Fault" condition), which apparently indicates that a delivery item 110 is present and blocking the path. Then the method 500 proceeds to step 512. In step 512, the processor(s) 905 (for example, a processor 905 of the camera filtering and monitoring system 322) may engage in an image analysis of a current image 406 from the camera 304.

Image analysis employing image processing methods well known in the art is employed to confirm whether or not the apparent presence of a package (indicated by the blocked status") is, in fact, actually the presence of a package. Image analysis, then, is used to either confirm that a package 110 is present on the conveyor belt 102 or to identify that a detection error has occurred and so to identify that the apparent presence of a package is erroneous. For example, a threshold test may be employed, where if image analysis reveals that more than 20% of the conveyor belt 110 within the field of view 402 is covered by an object, then a determination is made that a package 110 is present and is causing the light blockage. The value of 20% is exemplary only, and higher or lower thresholds may be employed, such as 10%, 15%, 18%, 22%, 24%, 26%, 28%, 30%, or more.

Other image processing analyses and tests may be employed as well, including for example and without limitation: image processing/testing to determine whether specific predetermined sub-areas of the field of view 402 of the belts 102 are covered by an item; to determine whether detected shapes on the belts 102 are rectangular or cuboidal or not, or have linear edges or not; or to identify particular geometric shapes on the belts 102; or to identify irregular shapes on the belts 102. Suitable threshold criteria may also be defined, so that comparing a detected shape or shapes against the threshold criteria results in a determination of whether a package 110 is present or not present on the conveyor belt 102.

In an embodiment, multiple different image processing methods and appropriate thresholds may be applied, with any one of them or some logical combination(s) of them determining whether or not one or more deliverable items 110 are present on the conveyor belt 102.

If the determination in step 512 is that a package is present on the belt (e.g., the image processing analyses and tests confirm or concur that the photoeye 106.2 has detected a single package or multiple packages in step 504), then the method 500 proceeds to step 516. In step 516 the Blocked or Fault status is maintained or passed on to the control system 114 to determine a suitable transfer action.

For example, in an embodiment, a suitable transfer action may simply be stopping or altering the motion of the conveyor belt 102; and/or may entail activating a package shunting mechanism, sorting mechanism, or routing mechanism. Other system actions may be envisioned as well. The method 500 then repeats, returning to step 504.

Persons skilled in the relevant arts will appreciate that shunting, sorting and routing mechanisms may be controlled by sensing actions and sorting algorithms in addition to those disclosed in detail herein. For example, in addition to distinguishing between separate delivery items 110, sorting and shunting may entail identification of routing information (e.g., address information) which is identified on exterior packaging via text, barcodes, or similar. Similarly, sorting, shunting, and routing may entail identification by microprocessor 100 of appropriate conveyor belts 102 or receiving stations within a delivery item processing facility. Such sensing, mechanisms and methods are beyond the scope of this document.

Returning to step 512, additional image processing may help determine if two or more packages 110 are present. For example, if two packages 110 are touching each other and/or are partly side-by-side on conveyor device 102 (so that areas of each package 110 which block the light beam 122 overlap), this may result in one time-extended blocked signal, which is erroneous. Based only on the analysis of the light blockage, a system 100 with a photoelectric sensor only may erroneously assess that a single package is present. However, additional image analysis of image 104 may identify that two (or more) distinct shapes are present, for example (viewed from above) two distinct rectangular shapes which are touching but have distinct outlines—for example, two rectangular outlines at angles to each other, or a first rectangular outside and a second rectangular which is partly offset by some distance from the first—via standard image analysis techniques. In this case, as an extension of step 512 (not illustrated), exemplary vision-enhanced photocell system 300 may determine the presence of two (or more) packages.

In an embodiment, if method 500 determines that two or more packages 110 are present, then in steps 512 and/or step 516, the vision-enhanced photocell system 300 may insert, into signal 202, an artificial or emulated unblocked state, breaking the one time-extended blocked state into a modified signal sequence: blocked status (indicating the first package), unblocked status, and blocked status (indicating the second package). In this way, control system 114 receives an emulated signal or modified signal 202.2 that correctly identifies the presence of two packages. See FIG. 6 for further discussion of modified signals.

If the determination in step 512 is that a package is not on the belt, (e.g., the image processing analyses and tests do not determine or confirm that the photoeye 106.2 has detected a single package in step 504), then the method 500 proceeds to step 520. In step 520 the Fault condition is inhibited, effectively asserting a "Not Blocked" status, and the modified "Not Blocked" state is transmitted or otherwise provided to control system 114 to determine and enact a suitable transfer action by the conveyor system.

In an embodiment of the present system and method, exemplary vision-enhanced photocell system 300 may attempt to determine a cause of the false blocked status. For example, visual analysis may determine that while no moving package 110 is present on conveyor device 102, a delivery item 110 may have become stuck in front of light source 106.1 or photodetector 106.2. This may be determined, for example, by examining multiple images 406 in time series, and determining the persistence of a delivery item in the same position in front of light source 106.1 or photodetector 106.2 in successive images. Suitable action may here entail signaling an operator to remove the stuck package 110.

For example, and as per the discussion above, in an embodiment, suitable action may simply entail maintaining the conveyor belt 102 at a current, constant motion, and/or may entail not activating any package shunting mechanisms or routing mechanisms. Other system actions may be envisioned as well.

The method 500 then repeats, returning to step 504.

In an alternative embodiment of method 500, step 504 may be modified. For example, in an alternative embodiment, in step 504—instead of determining if the photoelectric system 106 has determined that the light beam 122 is blocked, the step 504 may entail identifying any transition in the detected state of the light beam 122. In such an embodiment, step 504 identifies any time when there is a transition from a blocked light beam 122 to unblocked, or a transition from an unblocked beam 122 to a blocked beam. Additional embodiments may detect where there may have been a transition, e.g., when the intensity or blockage of the light beam 122 is ambiguous. If the step 504 determines that a transition has not been made, then the method 500 may determine that no action is required. Conversely, upon any determination that the state of light beam 122 has changed or has become ambiguous, the method may continue with step 512, and then with steps 516 or 520 as appropriate.

The exemplary method 500, described above, may be summarized by saying that the method may employ photocell detection of a potential delivery item 110 (or lack of such an item) as an event that triggers in the processor a more-fine-grained, photographically-based assessment of whether or not one or more delivery items 110 are present on the conveyors 102. In an embodiment, the camera 304 takes pictures continually, but the system analyzes only selected conveyor images when triggered by the photocell signal. In an alternative embodiment, the camera 304 may be triggered to capture an image 406 responsive to a change in the state or status of the light sensing signal 202. In an alternative embodiment, the method may capture images of the conveyor system 102 both at regularly timed intervals, and also when triggered by state changes in the light sensing signal 202.

Package Detection Signal Modification: FIG. 6 diagrammatically represents a modification process of an exemplary status signal 202 according to the present system and method, for example in accordance with the method 500 presented above in conjunction with FIG. 5.

As shown in the figure, the photoelectric system 106 produces an exemplary first light status signal 202.1 which indicates whether the path of the light beam 122 is blocked (e.g., a high signal state) or unblocked (e.g., a low signal state). The signal 202.1 is shown enlarged at left in the figure.

As can be seen in the figure, most of the signal high states 602 are of a similar and substantial width, and tend to indicate the presence of a package 110 blocking the light beam 122. However, one particular high state 604.1 is narrower than the others; this could indicate an unusually small package 110, but may also indicate an error in detection due to some unknown cause.

As discussed above (for example, with respect to some embodiments of step 504 of method 500), various changes in the state of the signal 202 may trigger analysis of the image data 406 sent from the camera 304 to the camera filtering and monitoring system 322. Continuing with FIG. 6, it may be seen that the first signal 202.1 is processed by the camera filtering and monitoring system 322 (labeled synonymously, in the figure, as "Camera Filtering and Locating") 322 according to the image data 406 captured by the camera 304.

Modified Light Status Signal: The camera filtering and monitoring system 322 may receive multiple images 406 from the camera 304. Using for example suitable timing information for the signal 202 and from the camera 304, the camera filtering and monitoring system 322 identifies the image data 406 which is correlated with the narrow high signal 604.1. Based on analysis of the image data, the camera filtering and analysis system 322 may determine that no package is actually present on the conveyor belt 102 at the time of the narrow signal peak 604.1. Consequent to this determination, the camera filtering and monitoring system 322 eliminates the narrow peak 604.1 from the signal, resulting in a modified light status signal 202.2 with a signal low value 604.2 replacing the former, narrow signal high value 604.1.

The filtered or modified light status signal 202.2, with a suitable low value 604.2 to indicate when/where a package is not present on the conveyor belt 102, is then passed, transmitted, or otherwise provided to the control system 114. This enables the control system 114 to take suitable action, or take no action as appropriate, responsive to the filtered signal 202.2

Signal modification or emulation: In an embodiment of the present system and method, the first status signal 202.1 may be understood as an original or actual light status signal 202.1, directly indicating when light from the light emitter 106.1 is received by the light detector 106.2. The actual light status signal 202.1 is intended as also being a control signal, telling the control system 114 whether or not delivery items 110 are present on the conveyor belts 102. However, as discussed above, the actual light status signal 202.1 may sometimes contain erroneous indications of delivery item presence or absence.

By contrast, in an embodiment, the filtered status signal 202.2 may be understood as an emulated or modified light status signal 202.2. The emulated signal 202.2 more accurately indicates the presence or absence of the delivery items 110 on the conveyor 102. In this way, the emulated signal serves as a more effective or reliable or more-often-correct control signal 202 for the control system 114. Further, the use of an emulated light status signal 202.2 as input to the control system 114 thereby improves system performance, without any need to change the logic or electronics of the control system 114.

In an embodiment of the present system and method, the vision enhanced photocell system 300 may be understood as fine-tuning and/or altering the timing within the actual light status signal 202.1 to generate an emulated light status signal 202.2, timing the photocell signal to match what it should actually be in view of the images 406 of the packages 110 on the conveyor system 102. The camera 304 analyses the package images 406, and then sends an emulated signal 202.2 which is cleaned up for better timing, as if the photocell were getting a perfect signal.

As described above, modifying the signal timings may entail adding entirely new high states 604.1 or low states 604.2, when the image analysis indicates package presence or absences which were not properly detected by the photocell 106.2 In an embodiment, modifying the signal timings may also entail small time shifts in the start time or end time of a high state 604.1 or low state 604.2. This may reflect a photographic determination, for example, that a high signal state 604.1 was prematurely signaled by a flap or fold in packaging which is extended (i.e., "sticks out") from the main body or main mass of a package. Such small time shifts may for example be on the order of fractions of a second (for example, dozens or hundreds of microseconds). The modified timings in the emulated signal 202.2 better reflects the actual positions of packages 110 on the conveyor.

Stated another way: By employing the same control logic on the control system(s) 114, the present system and method achieves improved item control and sorting via the creation of an improved, modified control signal 202.2, which provides a more reliable and accurate source of delivery item presence/absence data based on the information from the camera 304.

Figure 7:
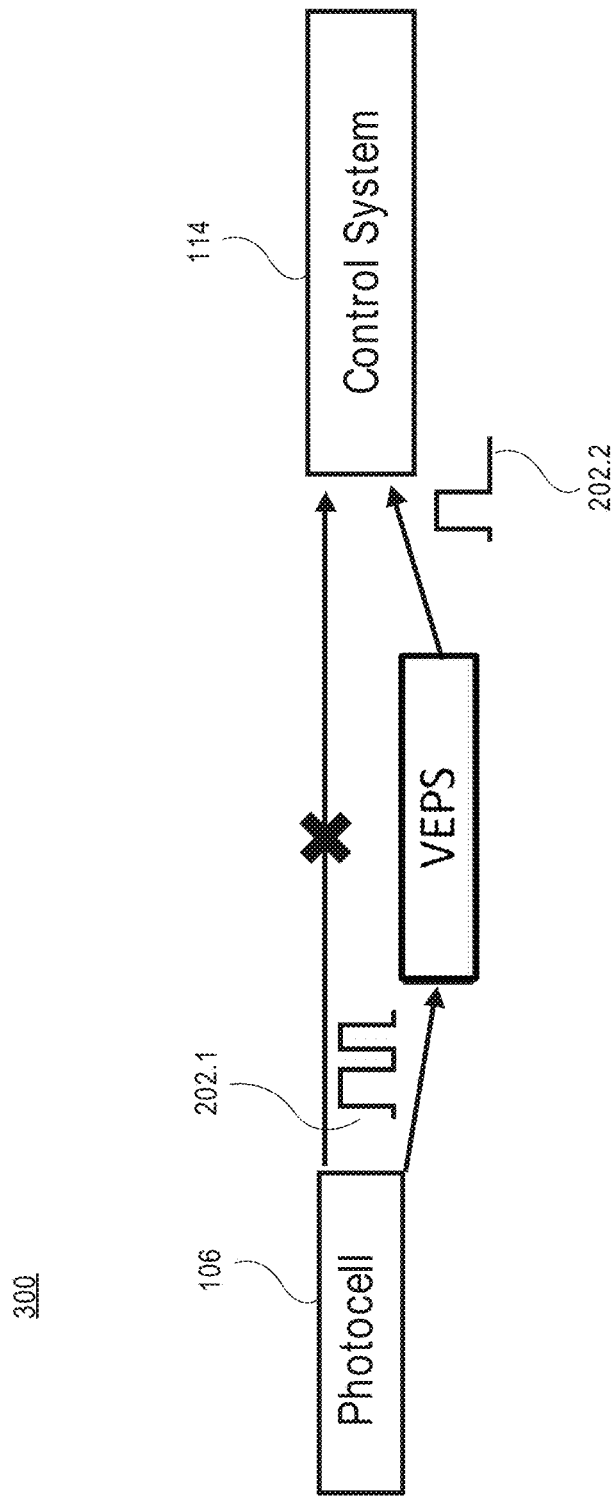
FIG. 7 presents another view of a signal processing according to the present system and method, contrasting a signal based on only photo-emitter information versus the signal as additionally processed by an exemplary vision-enhanced photocell system.

FIG. 7 presents another view of substantially the same signal processing as presented and discussed immediately above in conjunction with FIG. 6, contrasting the signal 202.1 based on only the light detector 106.2 information versus the signal 202.2 as additionally processed by an exemplary vision-enhanced photocell system 300 according to the present system and method.

It may be seen from FIG. 7 that without the vision-enhanced photocell system 300 (and in particular, as above, without the camera 304 and the camera filtering and monitoring system 322), an unmodified light detection signal 202.1 is passed or provided directly to conveyor control system 114. Any errors in the unmodified light detection signal 114, indicating the presence of a package 110 where there is none (or indicating the absence of a package 110 when one is present or indicating the presence of single package 110 when two or more packages are present) will almost certainly result in control errors by the control system 114. Suitable processing by the vision-enhanced photocell system 300 (in an embodiment, construed principally as the camera 304 and the filtering/monitoring system 322) results in a modified signal 202.2. The modified signal, based on suitable image processing, more accurately indicates when and where packages 110 are present, or are not present, on the conveyors 102. This results in more reliable, accurate, and efficient system regulation, control, and package movement by the control system 114.

Exemplary Image Processing

Figure 8:
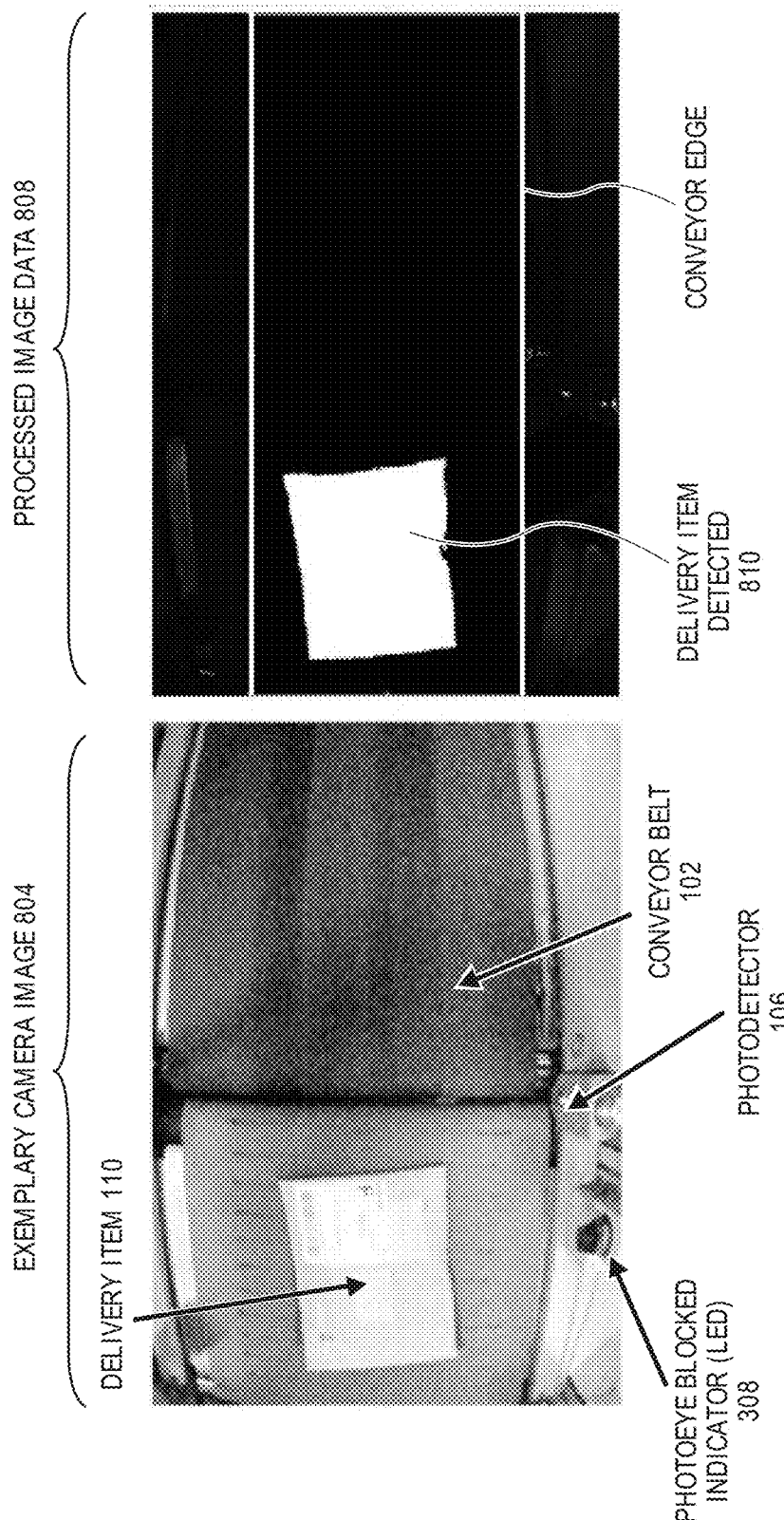
FIG. 8 illustrates a before-and-after outcome of an exemplary image processing activity, such as that which may be performed by an exemplary camera filtering and monitoring system according to the present system and method.

FIG. 8 illustrates a before-and-after outcome of an exemplary image processing activity, such as that which may be performed by an exemplary camera filtering and monitoring system 322 according to the present system and method, to help identify a delivery item or package 110 on the conveyor belt 102.

In the figure, the exemplary camera image or photograph 804 on the left is a picture taken by an overhead black-and-white camera 304 within an actual prototype vision-enhanced photocell system 300. The viewing area 402 of the photograph 804 encompasses at least portions of two adjacent conveyor belts 102, any delivery items 110 which may be present on those portions of the belts 102, and also a photoeye blocked indicator, which is an LED 308, which indicates whether the photodetector 106 is blocked or unblocked.

Not shown in the figure, but discussed above in this document, is that the image data 406 for the photograph 804 would be passed from the camera 304 to the camera filtering and monitoring module 322 via the communications link 318. The camera filtering and monitoring system 322 then further processes and analyses the image data 406.

In the figure, an example of processed image data or a processed image 808 is shown on the right. The image 804 may be processed to produce the image 808 via any number of image processing techniques known in the art, including for example and without limitation contrast enhancement, lightening or darkening, edge detection, and shape detection. As will be evident from the processed image data 808, and as can be determined via suitable shape detection algorithms, a single detected delivery item 810 (i.e., the bright white, semi-rectangular shape) is clearly present against the digitally enhanced, darkened background of the conveyor belt 102. Suitable algorithms may determine a specific size, position, and motion timing for the detected delivery item 810.

Exemplary Digital Processing, Monitoring, and Control System

The present system and method employs one or more data processing and communication systems. Such systems include: desktop computers; file servers; both clients and servers of client-server systems; tablet computers; cell phones; and also specialized data processing systems such as a control system 114 to control an item processing/sorting system 300 and/or a camera filtering and monitoring module 322.

FIG. 9 illustrates some elements of an exemplary processing and/or communications system 900, which may in the present context be part of or the whole of control system 114 to control an item processing/sorting system 300 and/or a camera filtering and monitoring module 322. Persons skilled in the relevant arts will appreciate that the elements shown are representative elements of such systems, and that particular data processing and/or communication systems may employ only some of the elements shown, or may employ variations on the elements shown, or may utilize additional elements not shown.

In an embodiment, a processing system 900 according to the present disclosure includes a hardware processor or hardware microprocessor 905; a volatile memory 910 such as random access memory (RAM) for dynamic data processing and program storage; a static or non-volatile memory 115 such a ROM/Flash memory for either or both of maintaining operating system and low-level hardware support code, and also for long-term data storage; and a hard disk drives 920 or hard drive alternatives such as solid state drives (SSD) or flash drives for non-volatile, long-term but dynamic storage of very large quantities of data.

In some embodiments, a processing system 900 may also include a variety of user-interface elements, including audio elements 925 such as a speaker and/or microphone; a display screen 930, which may be a touch-screen display, for presentation of data and graphics to persons; and a keyboard 935 for entry of text, numbers, punctuation, and control actions. In some embodiments, the touch-screen display 930 may provide dual functionality as a keyboard 935. The processing system 900 may also additional input controls such as a mouse or touchpad (not shown in the figure).

The processing system 900 may also include a variety of sensors 960, such as a photocell system 106 or camera 304, configured to support the detection of delivery items 110 on a conveyor belt 102. In an alternative embodiment, the sensors 960 may not be construed as part of the processing system 900 in itself, but may be seen as external elements which may receive data from and/or send data to the processing system 900.

The processing system 900 may also include a wired communications system 940 (such as USB or Ethernet, or other forms of tangible electrical connection or cabling) or a wireless communication system 940 such as WiFi or BlueTooth. The communications system 940 enables the processing system 900 to communicate with other processing systems 900 and external devices via either or both of local communications networks and large-scale networks such as the Internet; and also to store and retrieve data from distributed cloud storage (not illustrated).

In an embodiment, the processing system 900 may include a printer 950.

In an embodiment of the present system and method, the processing system 900 may include one or more mechanical or electro-mechanical control elements 955 such as, for example and without limitation, controls for motor speed and motion, robotic arms, sorting mechanisms, shunting mechanisms, and other servo-mechanisms configured for mechanical control of an environment, and in particular for sorting/shunting packages 110 in an automated sorting environment. Such mechanical control 955 may be used, for example, to control the movement of conveyor belts 102 and the movement of packages 110 in an item processing/sorting system 300.

In alternative embodiment, the mechanical control elements 955 may not be construed as part of the processing system 900 in itself, but may be seen as external elements which may be controlled by, receive data from, and/or send data to the processing system 900.

In some embodiments, processor 905 is communicatively coupled to the memory 910 and other storage 915, 920, to the user interface elements 925, 930, 935, to the communication system 940, to the sensors 960, the printer 950, and the mechanical control 955 via one or more system buses 145. The bus 145 may include various bus-mastering control chips (not illustrated). Various embodiments of system bus architecture such as PCI, SCSI, AGP, EIDE, HyperTransport, and InfiniBand, well known in the art or others to be developed, may provide for efficient data transfer and/or communication between the components (905, 910, 915, 920, 925, 930, 935, 940, 950, 955, 960) of the processing system 900 and may be employed in exemplary embodiments in accordance with the present disclosure.

Typically, the processor 905 is configured to execute instructions and to carry out operations associated with the processing system 900. For example, using instructions retrieved from memory 910, 915, 920 (e.g., a memory block), the processor 905 may control the reception and manipulation of input and output data between components of the processing system 900. The processor 905 typically operates with an operating system to execute computer code and to import and generate data. The operating system, other computer code, and data may reside within the memory 910, ROM 915, and hard disk storage 920 that is operatively coupled to the processor 905.

The operating system, other computer code, and data may reside in a volatile memory 910 which is permanently built into the processing system 900 or installed in a slot on the processing system 900; or on one or more removable, non-transitory storage medium (not illustrated) that is loaded or installed onto the processing system 900 when needed. Exemplary removable non-transitory storage media include CD ROM, PC-CARD, memory card, flash drives, floppy disks, and/or magnetic tape, and/or such other data and code storage media as may be developed in the future.

The operating system, other computer code, and data may also be hard-coded into the processing system 900 either as dedicated logic within the processor 905 or as non-volatile memory known as firmware 915.

In an embodiment, the instructions and data employed by the processing system may be organized into one or more modules. Such modules may be implemented, in whole or in part, as one or more of dedicated logic in the processor 905; firmware 915; dedicated, specialized processors (represented or subsumed in FIG. 9 by processor 905); and/or the volatile memory 910. Software modules may be dynamically loaded and unloaded (for example, from the disk drives 920) as needed to perform specialized tasks and operations. The software and modules may be configured, for example, to direct the processor to perform the methods, steps, and operations taught throughout this document, as well as similar methods, steps, and operations, for enhanced package identification, item processing and sorting in an electro-mechanical sorting and processing system.

As noted, the processing system 900 typically includes a communications system 940, which may include either or both of a wired communications system and a wireless communications system. Communication system 940 may enable the processing system 900 to communicate with a wireless network, such as a cellular network (e.g., a GSM network, a CDMA network, or an LIE network), a local area network (LAN), and/or an ad hoc network.

Concluding Remarks

In the specification and/or figures, typical or exemplary embodiments of the system and method have been disclosed. The present invention is not limited to such exemplary embodiments. The use of the term "and/or" includes any and all combinations of one or more of the associated listed items. The figures are schematic representations and so are not necessarily drawn to scale, and the method steps disclosed in figures may only be summaries of method steps described in more specific and greater detail in the text of the disclosure. Unless otherwise noted, specific terms have been used in a generic and descriptive sense and not for purposes of limitation.

What is claimed is:

1. A sensing system for detecting delivery items, the sensing system comprising:
a conveyor device that moves one or more delivery items that are on the conveyor device;
a light source that is arranged to emit a light beam across the conveyor device at a sensing location;
a light detector that is arranged to detect the light beam, wherein the light detector generates a light status signal indicating when the light beam is blocked and when the light beam is not blocked by the one or more delivery items that are on the conveyor device;

a camera that is arranged to capture an image of the conveyor device at the sensing location; and a hardware processor that is operably connected to the light detector and the camera and that is configured to perform operations comprising:

receiving the light status signal from the light detector;

receiving an image from the camera, the image indicative of at least one of: the conveyor device or the one or more delivery items;

determining, based on the image from the camera, that a delivery item is or is not present at the sensing location at a particular point in time;

based on the determination of the presence or lack of presence of the delivery item, determining that either a blocked signal state or an unblocked signal state of the light status signal is erroneous, wherein the erroneous light signal state comprises an incorrect indication of the presence or non-presence of a delivery item at the sensing location; and based on the determination of an erroneous item presence indication, generating a modified light status signal, wherein:

the modified light status signal substitutes the blocked signal state for the unblocked signal state or substitutes the unblocked signal state for the blocked signal state, wherein the modified light status signal provides a correct indication of the presence or non-presence of the delivery item at the sensing location.

2. The sensing system of claim 1, wherein the sensing location comprises a transition location along the conveyor device; and the hardware processor is further configured to perform operations comprising:

determining, based on the light status signal and the image, if a delivery item which is present at the transition location is at least one of:

suitable for a transfer action at the transition location; or stuck at the transition location.

3. The sensing system of claim 1, wherein the hardware processor is further configured to perform operations comprising: determining, based on the light status signal and the image, that two or more delivery items are present at the sensing location.

4. The sensing system of claim 1, wherein the system is configured to communicate, to the conveyor device, the modified light status signal in place of the light status signal from the light detector.

5. The sensing system of claim 1, wherein the camera is configured to capture an image based on a trigger event, the trigger event comprising at least one of:

a change in the status of the light status signal from an unblocked state to a blocked state, or a change in the status of the light status signal from a blocked state to an unblocked state.

6. The sensing system of claim 1, further comprising:

a status indicator light arranged to be within a field of view of the camera and to provide a visual indication when the light detector is receiving the light beam and when the light detector is not receiving the light beam; and wherein at least one of the hardware processor or the camera is configured to cause the camera to take a photo image based on the visual indication from the status indicator light.

7. A sensing system for detecting delivery items, the sensing system configured to be placed at a sensing location along a conveyor device that moves one or more delivery items that are on the conveyor device, and comprising:

a light source configured to emit a light beam across the conveyor device at the sensing location;

a light detector that is arranged to detect the light beam, wherein the light detector generates a light status signal indicating when the light beam is blocked and when the light beam is not blocked by the one or more delivery items that are on the conveyor device;

a camera that is arranged to capture an image of the conveyor device at the sensing location; and a hardware processor that is operably connected to the light detector and the camera, and that is configured to perform operations comprising:

receiving the light status signal from the light detector;

receiving an image from the camera, the image indicative of at least one of: the conveyor device or the one or more delivery items; and determining, based on the image from the camera, that a delivery item is or is not present at the sensing location at a particular point in time;

based on the determination of the presence or lack of presence of the delivery item, determining that either a blocked signal state or an unblocked signal state of the light status signal is erroneous, wherein the erroneous light signal state comprises an incorrect indication of the presence or non-presence of a delivery item at the sensing location; and based on the determination of an erroneous item presence indication, generating a modified light status signal, wherein:

the modified light status signal substitutes the blocked signal state for the unblocked signal state or substitutes the unblocked signal state for the blocked signal state, wherein the modified light status signal provides a correct indication of the presence or non-presence of the delivery item at the sensing location.

8. The sensing system of claim 7, wherein the sensing location comprises a transition location along the conveyor device; and the hardware processor is further configured to perform operations comprising:

determining, based on the light status signal and the image, if a delivery item which is present at the transition location is at least one of:

suitable for a transfer action at the transition location; or stuck at the transition location.

9. The sensing system of claim 7, wherein the hardware processor is further configured to perform operations comprising: determining, based on the light status signal and the image, if two or more delivery items are present at the sensing location.

10. The sensing system of claim 7, wherein the system is configured to communicate, to the conveyor device, the modified light status signal in place of the first light status signal from the light detector.

11. The sensing system of claim 7, wherein the camera is configured to capture an image based on a trigger event, the trigger event comprising at least one of:

a change in the status of the light status signal from an unblocked state to a blocked state, or a change in the status of the light status signal from a blocked state to an unblocked state.

12. The sensing system of claim 7, further comprising:
a status indicator light arranged to be within a field of view of the camera and to provide a visual indication when the light detector is receiving the light beam and when the light detector is not receiving the light beam; and
wherein at least one of the hardware processor or the camera is configured to cause the camera to take a photo image based on the visual indication from the status indicator light.

13. A computer-readable, non-transitory storage medium storing instructions that, when executed by a hardware processor of a sensing system, cause the hardware processor to execute a method for sensing one or more delivery items at a sensing location on a conveyor device, the method comprising:
receiving a light status signal, wherein the light status signal was generated by a photoelectric system to indicate the presence or absence of at least one delivery item at the sensing location;
receiving, from a camera, an image that includes the sensing location;
identifying, in the light status signal, either of a blocked light state or an unblocked light state at the sensing location;
determining, based on the image, that a delivery item is present or is absent at the sensing location;
based on the determination of the presence or absence of the delivery item based on the image, determining that either the blocked light state or the unblocked light state in the light status signal is an erroneous signal state comprising an incorrect indication of the presence or absence of the delivery item; and
based on the determination of the erroneous signal state, generating a modified light status signal, wherein the modified light status signal suitably substitutes in the light status signal the blocked signal state for the unblocked signal state or substitutes the unblocked signal state for the blocked signal state such that the modified light status signal provides a correct indication of the presence or absence of the delivery item at the sensing location; and
causing the conveyor device to perform a transfer action based upon the modified light status signal.

14. The computer-readable, non-transitory storage medium of claim 13, wherein causing the conveyor device to perform the transfer action comprises:
providing the modified light status signal to the conveyor device.

15. The computer-readable, non-transitory storage medium of claim 13, wherein the method further comprises:
initiating a capture of the image by the camera based on a trigger event, the trigger event comprising at least one of:
a change in a state of the light status signal as generated by the photoelectric system; or
a change in a visual indication generated by a status indicator light that is within a field of view of the camera and that provides the visual indication when the photoelectric system detects the one or more delivery item.

16. A sensing system for detecting delivery items, the sensing system comprising:
a conveyor device that moves one or more delivery items that are on the conveyor device;
a light source that is arranged to emit a light beam across the conveyor device at a sensing location that comprises a transition location;
a light detector that is arranged to detect the light beam, wherein the light detector generates a light status signal indicating when the light beam is blocked and when the light beam is not blocked by the one or more delivery items that are on the conveyor device;
a camera that is arranged to capture an image of the conveyor device at the sensing location; and
a hardware processor that is operably connected to the light detector and the camera and that is configured to perform operations comprising:
receiving the light status signal from the light detector;
receiving an image from the camera, the image indicative of at least one of: the conveyor device or the one or more delivery items;
determining, based on the light status signal and the image from the camera, whether there is no delivery item present on the conveyor device or there are one or more delivery items present on the conveyor device; and
determining, based on the light status signal and the image, whether a delivery item which is present at the transition location is at least one of:
suitable for a transfer action at the transition location; or
stuck at the transition location.

17. The sensing system of claim 16, wherein the camera is configured to capture an image based on a trigger event, the trigger event comprising at least one of:
a change in the status of the light status signal from an unblocked state to a blocked state, or
a change in the status of the light status signal from a blocked state to an unblocked state.

18. A sensing system for detecting delivery items, the sensing system configured to be placed at a sensing location along a conveyor device that moves one or more delivery items that are on the conveyor device, and comprising:
a light source configured to emit a light beam across the conveyor device at the sensing location, wherein the sensing location comprises a transition location;
a light detector that is arranged to detect the light beam, wherein the light detector generates a light status signal indicating when the light beam is blocked and when the light beam is not blocked by the one or more delivery items that are on the conveyor device;
a camera that is arranged to capture an image of the conveyor device at the sensing location; and
a hardware processor that is operably connected to the light detector and the camera, and that is configured to perform operations comprising:
receiving the light status signal from the light detector;
receiving an image from the camera, the image indicative of at least one of: the conveyor device or the one or more delivery items;
determining, based on the light status signal and the image from the camera, whether there is no delivery item present on the conveyor device or there are one or more delivery items present on the conveyor device; and
determining, based on the light status signal and the image, if a delivery item which is present at the transition location is at least one of:
suitable for a transfer action at the transition location; or
stuck at the transition location.

19. The sensing system of claim 18, wherein the camera is configured to capture an image based on a trigger event, the trigger event comprising at least one of:
   a change in the status of the light status signal from an unblocked state to a blocked state, or
   a change in the status of the light status signal from a blocked state to an unblocked state.

20. The sensing system of claim 18, wherein the hardware processor is further configured to perform operations comprising:
   in response to determining that the delivery item is stuck at the transition location, signaling an operator regarding the delivery item that is stuck.

\* \* \* \* \*